(12) United States Patent
Konno (10) Patent No.: US 8,001,431 B2
(45) Date of Patent: Aug. 16, 2011

(54) CONTROL APPARATUS

(75) Inventor: Katsuhiko Konno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/805,949

(22) Filed: Aug. 25, 2010

(65) Prior Publication Data

US 2010/0332917 A1    Dec. 30, 2010

Related U.S. Application Data (63) Continuation of application No. PCT/JP2008/053872, filed on Mar. 4, 2008.

(51) Int. Cl.
*G06F 11/00* (2006.01)
(52) U.S. Cl. ............... 714/57; 714/3; 714/4.12; 714/13; 714/42; 714/44
(58) Field of Classification Search ............. 714/3, 4.12, 714/42, 44, 57
See application file for complete search history.

(56) References Cited

U.S. PATENT DOCUMENTS

| | | | | |
|---|---|---|---|---|
| 5,313,628 | A * | 5/1994 | Mendelsohn et al. | 714/3 |
| 6,892,159 | B2 * | 5/2005 | Weiss et al. | 702/130 |
| 7,131,030 | B2 * | 10/2006 | Gilstrap et al. | 714/25 |
| 7,568,122 | B2 * | 7/2009 | Mechalke et al. | 714/47.3 |
| 2004/0210800 | A1 * | 10/2004 | Vecoven et al. | 714/47 |
| 2004/0221198 | A1 * | 11/2004 | Vecoven | 714/25 |
| 2006/0136645 | A1 * | 6/2006 | Merkin | 710/302 |
| 2008/0282113 | A1 * | 11/2008 | Yuuki et al. | 714/45 |
| 2010/0205607 | A1 * | 8/2010 | Shivanna et al. | 718/103 |

FOREIGN PATENT DOCUMENTS

| | | |
|---|---|---|
| JP | 6-309194 | 11/1994 |
| JP | 8-47064 | 2/1996 |
| JP | 8-171520 | 7/1996 |
| JP | 11-259339 | 9/1999 |
| JP | 2001-5687 | 1/2001 |
| JP | 2004-145715 | 5/2004 |
| JP | 2004-246468 | 9/2004 |
| JP | 2005-235078 | 9/2005 |

OTHER PUBLICATIONS

International Search Report for PCT/JP2008/053872, mailed Mar. 4, 2008.

* cited by examiner

*Primary Examiner* — Robert W Beausoliel, Jr.
*Assistant Examiner* — Charles Ehne
(74) *Attorney, Agent, or Firm* — Staas & Halsey LLP

(57) ABSTRACT

A control apparatus controls a device to which the control apparatus is connected. The control apparatus includes a storing unit and a linking unit. The storing unit stores an error message that contains information on a failed component in a storage device upon receiving the error message from the device. The linking unit stores the error message and information on a replacement component, which has been installed in the device in place of the failed component, in the storage device in association with each other upon receiving the information on the replacement component.

6 Claims, 10 Drawing Sheets

FIG.3

FAILED COMPONENT INFORMATION

| MANAGEMENT NUMBER | FAILURE DATE INFORMATION | MESSAGE INFORMATION | SERIAL NUMBER | COMPONENT VERSION NUMBER |
|---|---|---|---|---|
| A1001 | 2006/01/20 21:30 | machine1:Cabinet#0-SB#0-CPU#4 CPU Error | 00012 | 001 |

FIG.4

COMPONENT REPLACEMENT EVENT INFORMATION

| REPLACEMENT FLAG | INSTALLATION POSITION INFORMATION | SERIAL NUMBER | COMPONENT VERSION NUMBER | REPLACEMENT DATE INFORMATION |
|---|---|---|---|---|
| ON/OFF | MACHINE NUMBER, CABINET NUMBER, UNIT NUMBER, PARTS NUMBER | ○○○○ | ○○○○ | ○○○○ |

COMPONENT LIST
150a

| MANAGEMENT NUMBER | INSTALLATION POSITION INFORMATION | FAILURE FLAG |
|---|---|---|
| A10001 | machine1:Cabinet#0-SB#0-CPU#4 | OFF |
| A10002 | machine2:Cabinet#0-SB#0-CPU#3 | ON |
| A10003 | machine3:Cabinet#0-SB#0-CPU#2 | OFF |
| ... | ... | ... |

FIG.7

| MANAGEMENT NUMBER | FAILURE DATE INFORMATION | REPLACEMENT DATE INFORMATION | SERIAL NUMBER | COMPONENT VERSION NUMBER | MESSAGE |
|---|---|---|---|---|---|
| A10001 | 2006/1/20 21:30 | 2005/1/9 20:40 | 00012 | Version1 | CPU Error |
| A10001 | | 2007/2/3 18:33 | 00204 | Version2 | |
| ... | ... | ... | ... | ... | ... |
| A10002 | 2007/9/10 13:40 | 2006/8/13 12:15 | 00785 | Version1 | SB Error |
| ... | ... | ... | ... | ... | ... |

COMPONENT DETAIL INFORMATION 150b

FIG.8

COMPONENT ASSOCIATION
INFORMATION

| DATE | Parts |
|---|---|
| 2007/01/09 22:13:09 | machine1:Cabinet#0-SB#0-CPU#4 (STATUS CPU Changed)<br>OLD-S/N=00012 Version=001<br>NEW-S/N=00204 Version=002<br>machine1:Cabinet#0-SB#0 (STATUS SB Changed)<br>OLD-S/N=00000785 Version=001<br>NEW-S/N=00001009 Version=001 |

FIG.9

COMPONENT ASSOCIATION
DETAIL INFORMATION

Machine1　⎫
[CPU Information]　⎬ (INSTALLATION POSITION)
Cabinet#0-SB#0-CPU#4:　⎭
Serial No: 00012　　⎫ (INFORMATION UNIQUE TO PRE-
Version: 001　　　　⎬ REPLACEMENT COMPONENT)
Status: Nomal
History: 2007/02/03 18:33 Changed　　(REPLACEMENT DATE INFORMATION)
　　　　Serial No: 00204 Version: 002　(INFORMATION UNIQUE TO POST-
　　Other parts: Cabinet#0-SB#0 changed　　REPLACEMENT COMPONENT)

FIG.10

COMPONENT FAILURE REPORT 2007/01/10

USER NAME: COMPANY xxxxx
OCCURRENCE DATE: 2006/01/20 21:30
MESSAGE: CPU Error
INSTALLATION POSITION: machine1:Cabinet#0-SB#0-CPU#4
REPLACEMENT DATE: 2007/02/03 18:33
COMPONENT INFORMATION:
　　FIRST COMPONENT NAME: (CPU) (MODEL NUMBER)
　　　OLD COMPONENT INFORMATION: (SERIAL NUMBER) (COMPONENT VERSION NUMBER)
　　　NEW COMPONENT INFORMATION: (SERIAL NUMBER) (COMPONENT VERSION NUMBER)
　　　OLD REPLACEMENT INFORMATION: 200xx/xx/xx xx:xx:xx (SERIAL NUMBER) (COMPONENT VERSION NUMBER)
　　*DISPLAY HISTORY IF REPLACEMENT WAS PERFORMED BEFORE
　　SECOND COMPONENT NAME: (Sytem-Board) (MODEL NUMBER)
　　　OLD COMPONENT INFORMATION: (SERIAL NUMBER) (COMPONENT VERSION NUMBER)
　　　NEW COMPONENT INFORMATION: (SERIAL NUMBER) (COMPONENT VERSION NUMBER)
　　THIRD COMPONENT NAME:
LOG INFORMATION: DISPLAY SITE IF THERE IS CORRESPONDING LOG INFORMATION

CONTROL APPARATUS

CROSS-REFERENCE TO RELATED APPLICATION(S)

This application is a continuation of International Application No. PCT/JP2008/053872, filed on Mar. 4, 2008, the entire contents of which are incorporated herein by reference.

FIELD

The embodiment discussed herein is directed to a control apparatus that easily acquires information on a replaced component.

BACKGROUND

Recently, in systems that include a user device that a user uses and a control apparatus that controls the user device, if a failure occurs in the user device, the control apparatus specifies the failed component and a worker who refers to information on the failed component replaces the failed component with a new component (see Japanese Laid-open Patent Publication No. 2004-246468 and Japanese Laid-open Patent Publication No. 11-259339). When the worker replaces the failed component of the user device, information on the replaced failed component of the user device is updated with information on the component with which the failed component has been replaced.

However, in the above-described conventional technology, when a component of the user device is replaced, information on that component is updated with information on a component that is used for replacement. This leads to a problem in that information on the replaced component (failed component) does not remain. Thus, it is very difficult to search for information about the replaced component again if the information on the replaced component is not accurate due to a failure in information management. Thus, information unique to the failed component may be lost.

SUMMARY

According to an aspect of an embodiment of the invention, a control apparatus that controls a device to which the control apparatus is connected, the control apparatus includes: a storing unit that stores an error message that contains information on a failed component in a storage device upon receiving the error message from the device; and a linking unit that stores the error message and information on a replacement component, which has been installed in the device in place of the failed component, in the storage device in association with each other upon receiving the information on the replacement component.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. Note that the embodiments do not limit the invention.

First, an overview and characteristics of a control apparatus according to one embodiment are explained. The control apparatus according to the embodiment is a control apparatus that controls a user device that a user uses. Upon receiving an error message that contains information on a failed component from the user device, the control apparatus temporarily stores the error message in a storage device. Upon receiving information on a replacement component that is installed in place of the failed component in the user device, the control apparatus links and stores, in the storage unit, information on the failed component (hereinafter, "pre-replacement component") and information on the component with which the failed component has been replaced (hereinafter, "post-replacement component"). The control apparatus, if necessary, associates and outputs the information on the pre-replacement component and the information on the post-replacement component.

Because the control apparatus according to the embodiment stores the information on the pre-replacement component and the information on the post-replacement component in association with each other, a manager of the control apparatus can easily acquire the information on the pre-replacement component based on the information on the post-replacement component. In addition, because the information on the pre-replacement component (the error message) and the information on the post-replacement component are linked and stored, it can be determined for certain whether component replacement has been performed.

Figure 1:
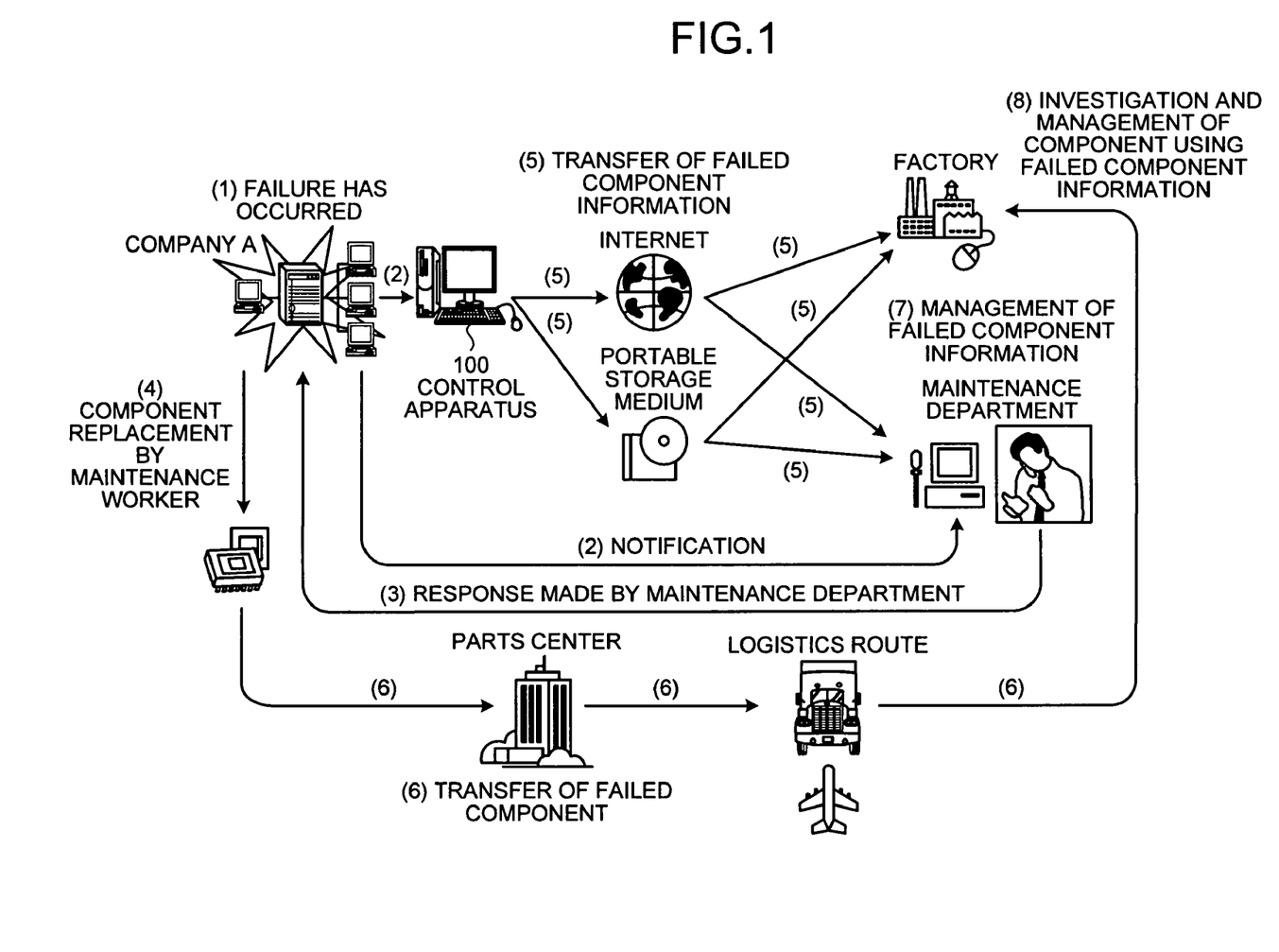
FIG. 1 is a diagram explaining the flow of information and a component through a system.

The flow of information and a component through the system that includes the control apparatus according to the embodiment will be explained below. FIG. 1 is a diagram explaining the flow of information and a component through the system. As illustrated in FIG. 1, if a failure has occurred in the user device that a company A possesses (see (1) in FIG. 1), information indicating that a failure has occurred is notified to a control apparatus 100 and a terminal device in the maintenance department (see (2) in FIG. 1).

The maintenance department make a response (see (3) in FIG. 1) and a maintenance worker performs component replacement (see (4) in FIG. 1). The control apparatus 100 associates the information on the pre-replacement component and the information on the post-replacement component and notifies the information to a terminal device in a factory and the terminal device in the maintenance department via the Internet (or a portable storage medium) (see (5) in FIG. 1).

The failed component is sent to the factory via a parts center and a logistics route (see (6) in FIG. 1). In the maintenance department, information on the failed component is managed (see (7) in FIG. 1). In the factory, the failed component is investigated and managed on the basis of the information on the failed component (see (8) in FIG. 1).

Figure 2:
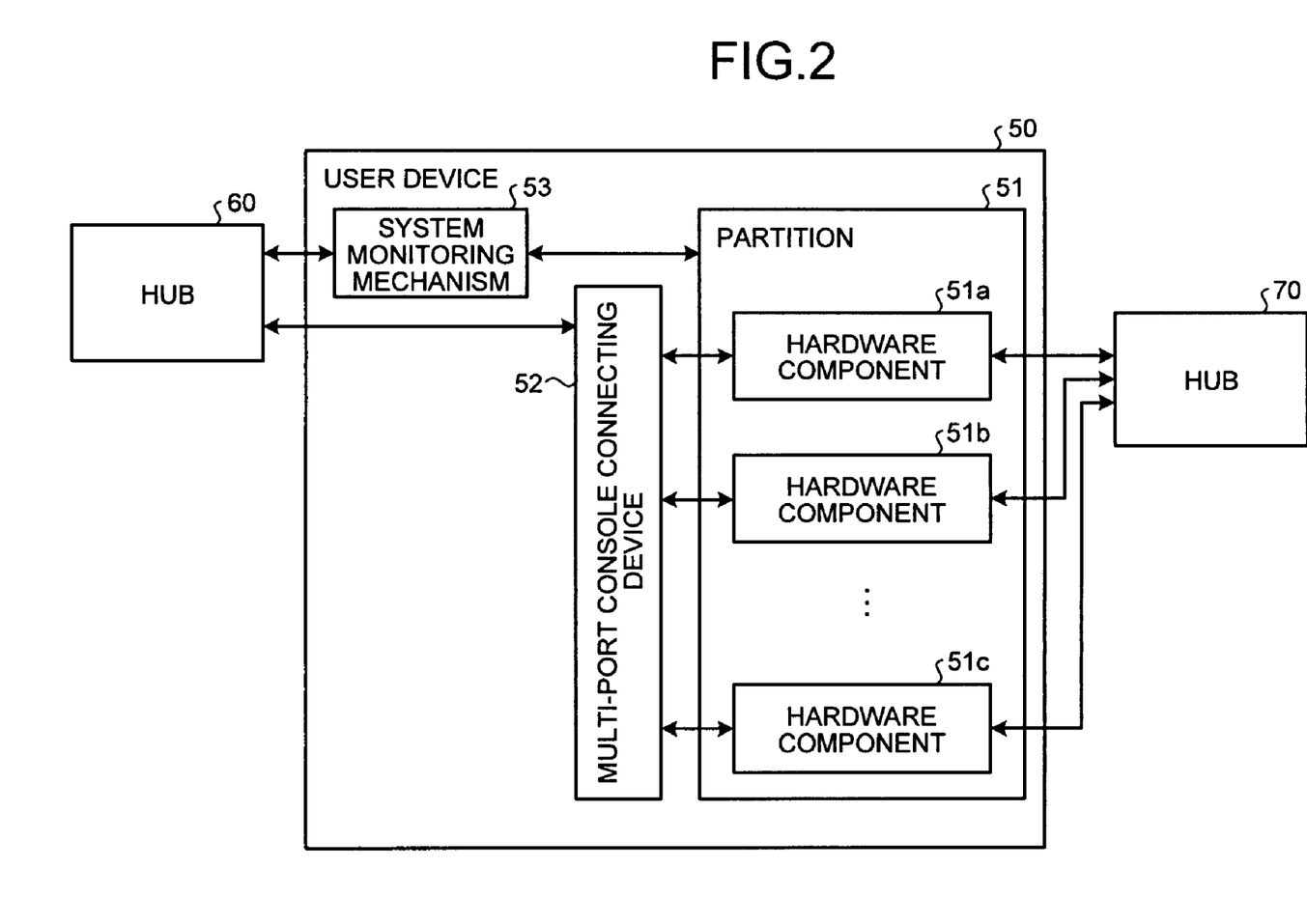
FIG. 2 is a functional block diagram illustrating a configuration of a user device according to an embodiment of the present invention.

A configuration of the user device according to the embodiment will be explained below. For example, a plurality of user devices is set up in company A represented in FIG. 1. FIG. 2 is a functional block diagram of a configuration of a user device 50 according to the embodiment. As illustrated in FIG. 2, the user device 50 includes a partition 51, a multi-port console connecting device 52, and a system monitoring mechanism 53. The user device 50 is connected to hubs 60 and 70 via a local area network (LAN).

The partition 51 is a unit that stores hardware components 51a to 51c. Although only the hardware components 51a to 51c are illustrated herein as an example, the partition 51 stores other hardware components.

The multi-port console connecting device 52 is a unit that controls communications between the control apparatus 100 and the hardware components 51a to 51c that are stored in the partition 51. The multi-port console connecting device 52 is connected to the hub 60 and the hardware components 51a to 51c.

The system monitoring mechanism 53 is a unit that monitors the state of the hardware components 51a to 51c that are stored in the partition 51. The processes that are performed by the system monitoring mechanism 53 are divided into processes that are performed when a failure has been detected and processes that are performed when a failed component has been replaced. The processes that are performed when the system monitoring mechanism 53 has detected a failure and the processes that are performed when a failed component has been replaced will be explained below.

First, the processes that are performed when a failure has been detected will be explained. If the system monitoring mechanism 53 has detected a failure in any one of the hardware components 51a to 51c, failure event information indicating that a failed hardware component (hereinafter, "failed component") has been detected is transmitted to the control apparatus 100 and the terminal device in the maintenance department (see FIG. 1). The system monitoring mechanism 53 may use any conventional technology in order to detect a failed component. For example, a control signal is output to a hardware component, and, if a response signal is not output from the hardware component, the hardware component is determined to be a failed component.

Figure 3:
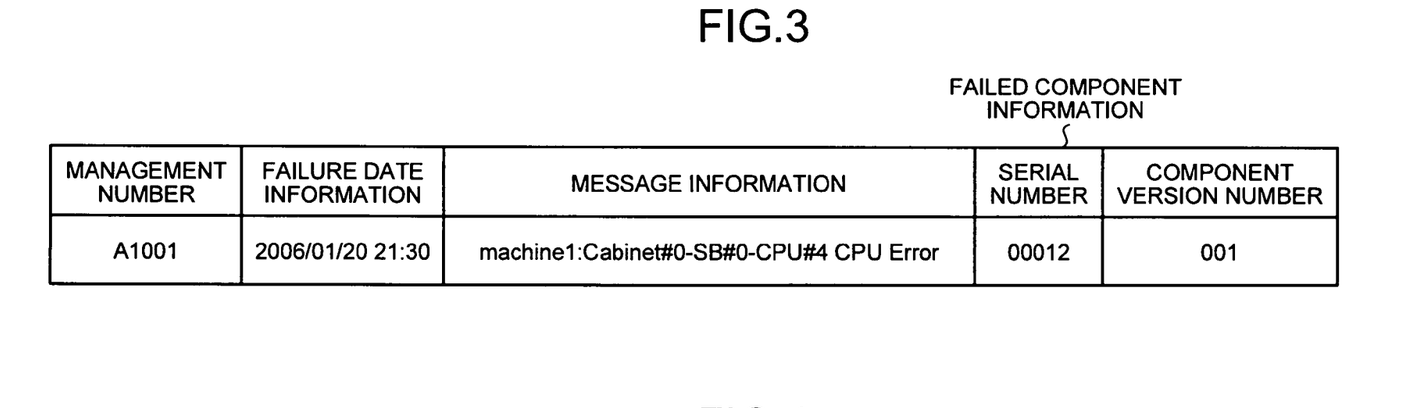
FIG. 3 is a table illustrating an example of the data structure of failed component information.

Upon detecting a failed component, the system monitoring mechanism 53 generates failed component information. The failed component information contains, for example, a management number, failure date information, message information, a serial number, and a component version number. FIG. 3 is a table illustrating an example of the data structure of failed component information. The message information illustrated in FIG. 3 contains information on the position where the failed component is installed. By referring to the message information, the failure site can be specified. In the example illustrated in FIG. 3, "machine1:Cabinet#0-SB#0-CPU#4" indicates the position where the failed component is installed and, for example, "CPU Error" indicates the nature of the failure. The serial number and the component version number represented in FIG. 3 are information unique to the failed component. The system monitoring mechanism 53 transmits the failed component information to the control apparatus 100.

The processes that are performed when a failed component has been replaced will be explained below. Upon detecting replacement of a failed component (upon receiving information indicating that a failed component has been replaced from a maintenance worker who is using an input device), the system monitoring mechanism 53 transmits component replacement event information to the control apparatus 100.

Figure 4:
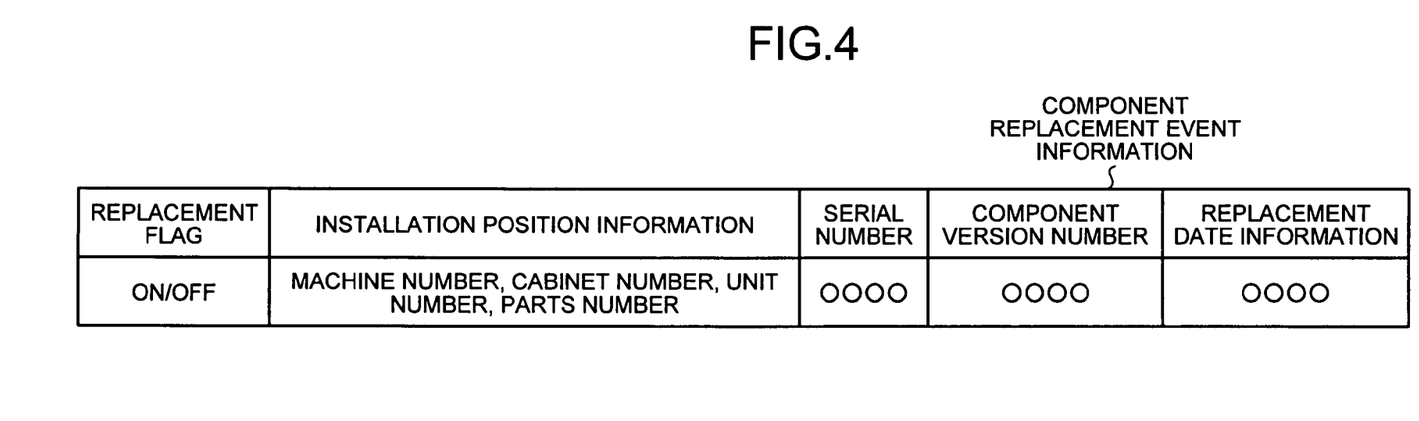
FIG. 4 is a table illustrating an example of the data structure of component replacement event information.

The component replacement event information contains, for example, a replacement flag, installation position information, a serial number, a component version number, and replacement-date information. FIG. 4 is a table representing an example of the data structure of the component replacement event information. The replacement flag is information for identifying the component replacement event information. By referring to the installation position information, the site where component replacement has been performed can be identified. The serial number and the component version number represented in FIG. 4 are information unique to the post-replacement component. The system monitoring mechanism 53 transmits the component replacement event information to the control apparatus 100.

Figure 5:
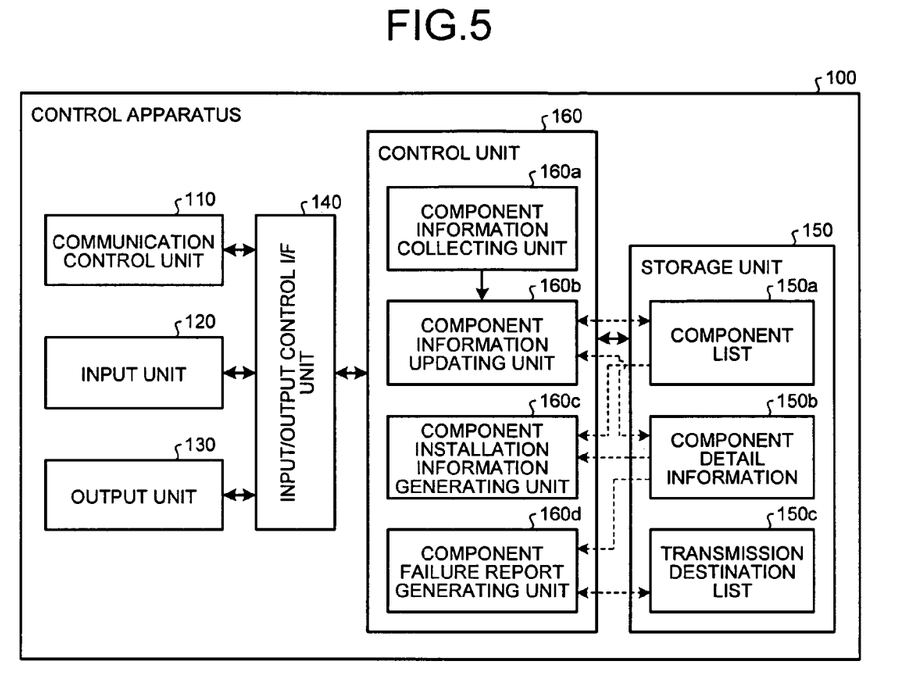
FIG. 5 is a functional block diagram of a configuration of a control apparatus according to the embodiment.

A configuration of the control apparatus 100 according to the embodiment will be explained below. FIG. 5 is a functional block diagram of a configuration of the control apparatus 100 according to the embodiment. As illustrated in FIG. 5, the control apparatus 100 includes a communication control unit 110, an input unit 120, an output unit 130, and an input/output control I/F unit 140, a storage unit 150, and a control unit 160.

The communication control unit 110 is a unit that is connected to the hubs 60 and 70 (see FIG. 2) via the LAN and controls communications mainly with the user device 50. The input unit 120 is an input unit that inputs various type of information. The input unit 120 may be configured as, for example, a keyboard, a mouse, and a microphone. The monitor, which will be described below (the output unit 130), also has a pointing device function in cooperation with the mouse.

The output unit 130 is an output unit that outputs various types of information. The output unit 130 is configured as a monitor (or a display or a touch panel) and a speaker. The input/output control I/F unit 140 is a unit that controls data input/output by the communication control unit 110, the input unit 120, the output unit 130, the storage unit 150, and the control unit 160.

The storage unit 150 is a storage unit that stores data and programs for various processes that are performed by the control unit 160. The storage unit 150 includes, as components closely related to the present invention, a component list 150a, component detail information 150b, and a transmission destination list 150c, as illustrated in FIG. 5.

The component list 150a is data in which the management number, the installation position information indicating the position where the hardware component is installed, and the failure flag indicating whether the hardware component at the installation position has failed are stored in association with one another. When the failure flag is set to "ON", this indicates that the component in the installation position has failed. In contrast, when the failure flag is set to "OFF", this indicates that the component in the installation position has not failed.

Figure 6:
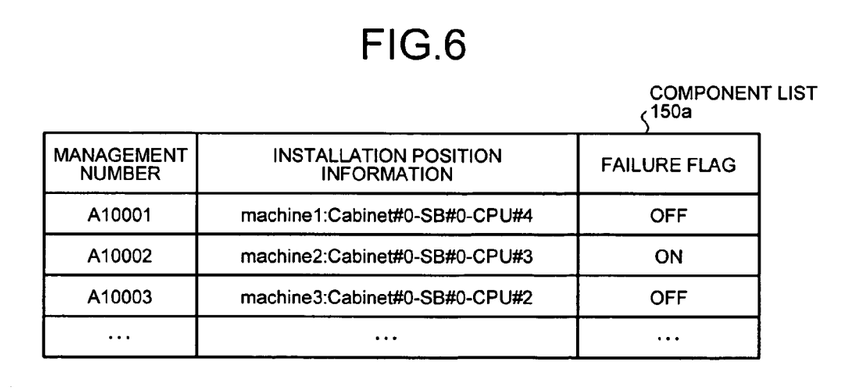
FIG. 6 is a table illustrating an example of the data structure of a component list.

FIG. 6 is a table illustrating an example of the data structure of the component list 150a. For example, the failure flag corresponding to the management number "A10002" is set to "ON" in the component list 150a illustrated in FIG. 6, which indicates that a failure has occurred in the component at the installation position "machine2:Cabinet#0-SB#0-CPU#3".

Figure 7:
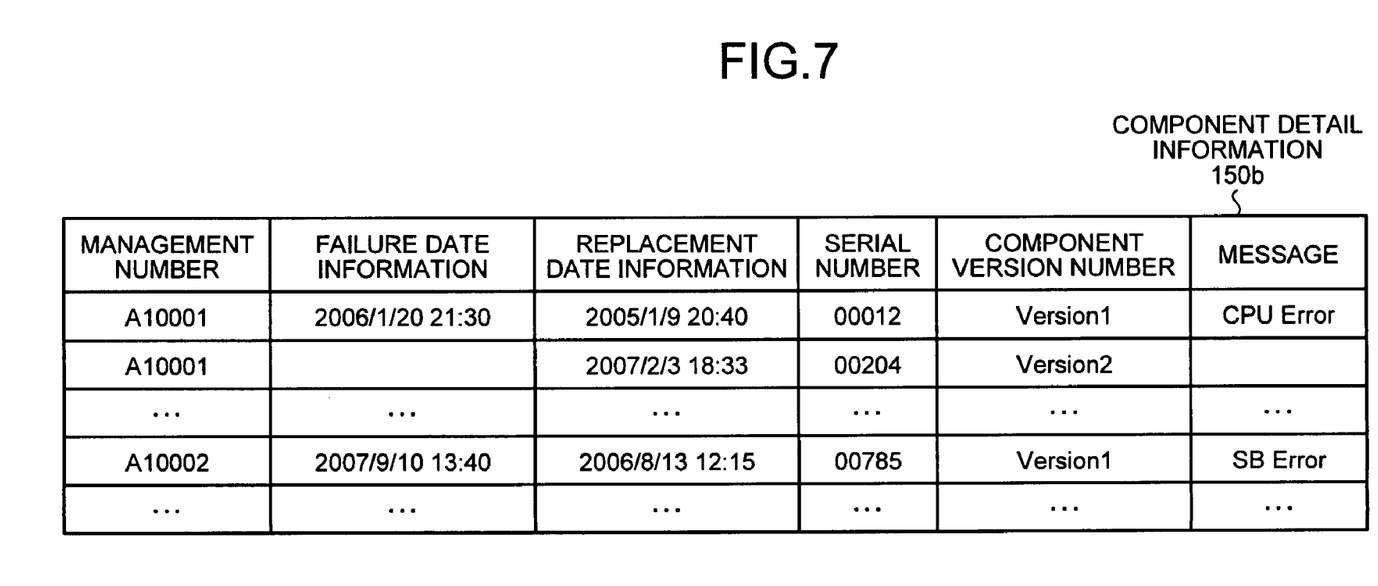
FIG. 7 is a table illustrating an example of the data structure of component detail information.

The component detail information 150b is information in which history of information on the components that have been installed at the installation positions in the component list 150a are stored in association with one another. FIG. 7 is a table illustrating an example of the data structure of the component detail information 150b. As illustrated in FIG. 7, the component detail information 150b contains a management number, failure date information, replacement date information, a serial number, a component version number, and a message. The message is information on the nature of the failure of the component.

The component with the latest replacement date is the component that is currently installed in the installation position. For example, the component that has been installed in the installation position "machine1:Cabinet#0-SB#0-CPU#4" corresponding to the management number "A10001" is the component corresponding to the serial number "00204" and the component version number "Version 2". Each time component replacement is performed, information unique to the component is added in association with the management number (the installation position information) to the component detail information 150b.

As illustrated in FIG. 7, even if a failed component has been replaced, the control apparatus 100 according to the embodiment saves the information unique to the failed component and stores information unique to the post-replacement component in association with the information unique to the failed component. For example, when the component list 150a and the component detail information 150b are compared with each other using the management number as a key, it can be determined that the component corresponding to the serial number "00204" and the component version number "Version2" has been installed in the component installation position "machine1:Cabinet#0-SB#0-CPU#4" and that the component corresponding to the serial number "00012" and the component version number "Version1" was installed in that component installation position prior to the component corresponding to the serial number "00204" and the component version number "Version2".

The transmission destination list 150c is information in which transmission destination addresses are stored to which component failure reports are transmitted. The component failure reports are generated by a component failure report generating unit 160d, which will be described below. The transmission destination list 150c contains, for example, the addresses of the terminal device in the maintenance department and the terminal device set up in the factory illustrated in FIG. 1.

The control unit 160 includes an internal memory for storing programs and control data that define various process procedures. The control unit 160 is a control unit that performs various processes according to the programs and the control data. The control unit 160 includes, as components closely related to the present invention, a component information collecting unit 160a, a component information updating unit 160b, a component installation information generating unit 160c, and a component failure report generating unit 160d.

The component information collecting unit 160a is a unit that, upon receiving the failure event information or the component replacement event information from the user device 50, performs a process corresponding to the event information. Upon receiving the failure event information from the user device 50, the component information collecting unit 160a issues a request for the failed component information to the user device 50 (see FIG. 3).

Upon receiving the failed component information from the user device 50, the component information collecting unit 160a outputs the received failed component information to the component information updating unit 160b. The component information collecting unit 160a also transmits the failed component information to the terminal device in the maintenance department. Upon receiving the component replacement event information from the user device 50 (see FIG. 4), the component information collecting unit 160a outputs the received component replacement event information to the component information updating unit 160b.

The component information updating unit 160b is a unit that, upon receiving the failed component information or the component replacement event information, registers/updates various types of information in the component list 150a and the component detail information 150b. Among the processes of the component information updating unit 160b, the process that are performed when failed component information has been received and processes that are performed when component replacement event information has been received are explained in this order.

First, the processes that are performed when the failed component information has been received are explained below. Upon receiving failed component information, the component information updating unit 160b compares the message information in the failed component information (the installation position information contained in the message information) with the installation position information in the component list 150a and then determines the management number corresponding to the identical installation position information in the component list 150a. The component information updating unit 160b then sets to "ON" the failure flag that corresponds to the determined management number.

The component information updating unit 160b associates the determined management number, the failure date information, the serial number, the component version number, and the message in the failed component information and then registers them in the component detail information 150b. For example, upon receiving the failed component information illustrated in FIG. 3, the component information updating unit 160b associates the management number "A10001", the failure date information "2006/01/20 21:30", the serial number "00012", the component version number "Version1", and the message "CPU Error" and registers them in the component detail information 150b.

The processes that are performed when the component information updating unit 160b receives the component replacement event information will be explained here. Upon receiving the component replacement event information, the component information updating unit 160b compares the installation position information in the component replacement event information with the installation position information in the component list 150a and then determines the management number corresponding to the identical installation position information in the component list 150a. The component information updating unit 160b sets to "OFF" the failure flag that corresponds to the determined management number.

The component information updating unit 160b associates the determined management number, the replacement date information, the serial number, and the component version number in the component replacement event information and then registers them in the component detail information 150b. When the management number to be registered has been already registered in the component detail information 150b, the component information updating unit 160b may register the above-described information just below the already registered entry.

When installation position information is specified via the input unit 120, the component installation information generating unit 160c compares the installation position information that has been specified (hereinafter, "specified installation position information"), the component list 150a, and the component detail information with one another. The component installation information generating unit 160c then generates component association information in which information (the serial number and the component version number) unique to the pre-replacement component and information (the serial number and the component version number) unique to the post-replacement component are associated with each other and then outputs the generated component association information to the output unit 130.

For example, when the specified installation position information "machine1:Cabinet#0-SB#0-CPU#4" is specified, the component installation information generating unit 160c compares the specified installation position information and the installation position information in the component list 150a and then determines the management number corresponding to the installation position information that is identical to the specified installation position information. By detecting the information unique to the pre-replacement component and the information unique to the post-replacement component in the component detail information 150b using the determined management number as a key, the component installation information generating unit 160c generates the component association information.

The information unique to the post-replacement component corresponds to the information unique to the component that is registered most recently among components corresponding to the identical management number. The information unique to the pre-replacement component is the information unique to the component that was registered before the information unique to the post-replacement component is registered.

Figure 8:
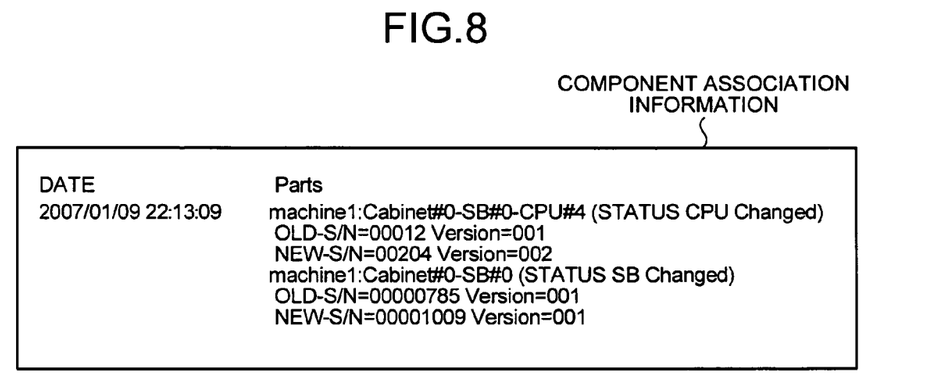
FIG. 8 is a view of an example of the data structure of component association information.

FIG. 8 is a view of an example of the data structure of the component association information. In the example illustrated in FIG. 8, the information unique to the pre-replacement component that corresponds to the installation position "machine1:Cabinet#0-SB#0-CPU#4" is the serial number "00012" and the component version number "001", and the information unique to the post-replacement component that corresponds to the installation position "machine1:Cabinet#0-SB#0-CPU#4" is the serial number "00204" and the component version number "002". In addition, the information unique to the pre-replacement component that corresponds to the installation position "machine1:Cabinet#0-SB#0" is the serial number "00000785" and the component version number "001", and the information unique to the post-replacement component that corresponds to the installation position "machine1:Cabinet#0-SB#0" is the serial number "00001009" and the component version number "001".

Figure 9:
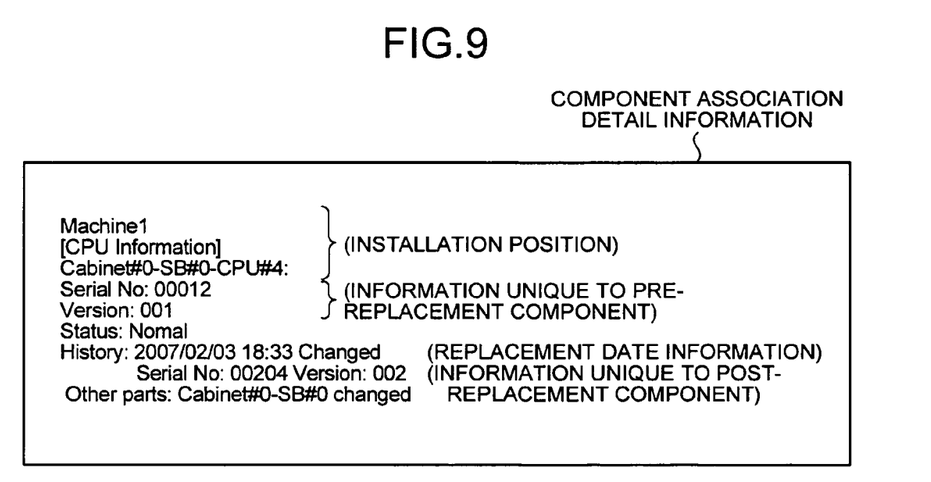
FIG. 9 is a view of an example of the data structure of component association detail information.

The component installation information generating unit 160c may generate component association detail information in which replacement date information on the replaced component is added to the above-described component association information. The component installation information generating unit 160c searches the replacement date information corresponding to the post-replacement component from the component detail information 150b and registers the replacement date information in the component association detail information. FIG. 9 is a view of an example of the data structure of the component association detail information. The component installation information generating unit 160c outputs the generated component association detail information to the output unit 130.

An explanation has been given for the case in which the component installation information generating unit 160c generates the component association information and the component association detail information when the installation position information is specified. Alternatively, the component installation information generating unit 160c may generate the component association information and the component association detail information on the basis of the installation position information in the component replacement event information, which is received by the component information collecting unit 160a, and output the information to the output unit 130. The method of generating the component association information and the component association detail information from installation position information is similar to the above-described method of generating component association information and component association detail information from specified installation position information.

After the component information collecting unit 160a receives the component replacement event information and the component information updating unit 160b updates the component list 150a and the component detail information, the component failure report generating unit 160d generates a component failure report, in which information unique to the pre-replacement component and information unique to the post-replacement component are associated with each other, and transmits the component failure report to the transmission destinations that are registered in the transmission destination list 150c. The component failure report generating unit 160d may transmit the component failure report to a destination by the Internet or by e-mail. Alternatively, the component failure report generating unit 160d may store the component failure report in a portable storage medium and a delivery person may deliver the portable storage medium to a given destination.

Figure 10:
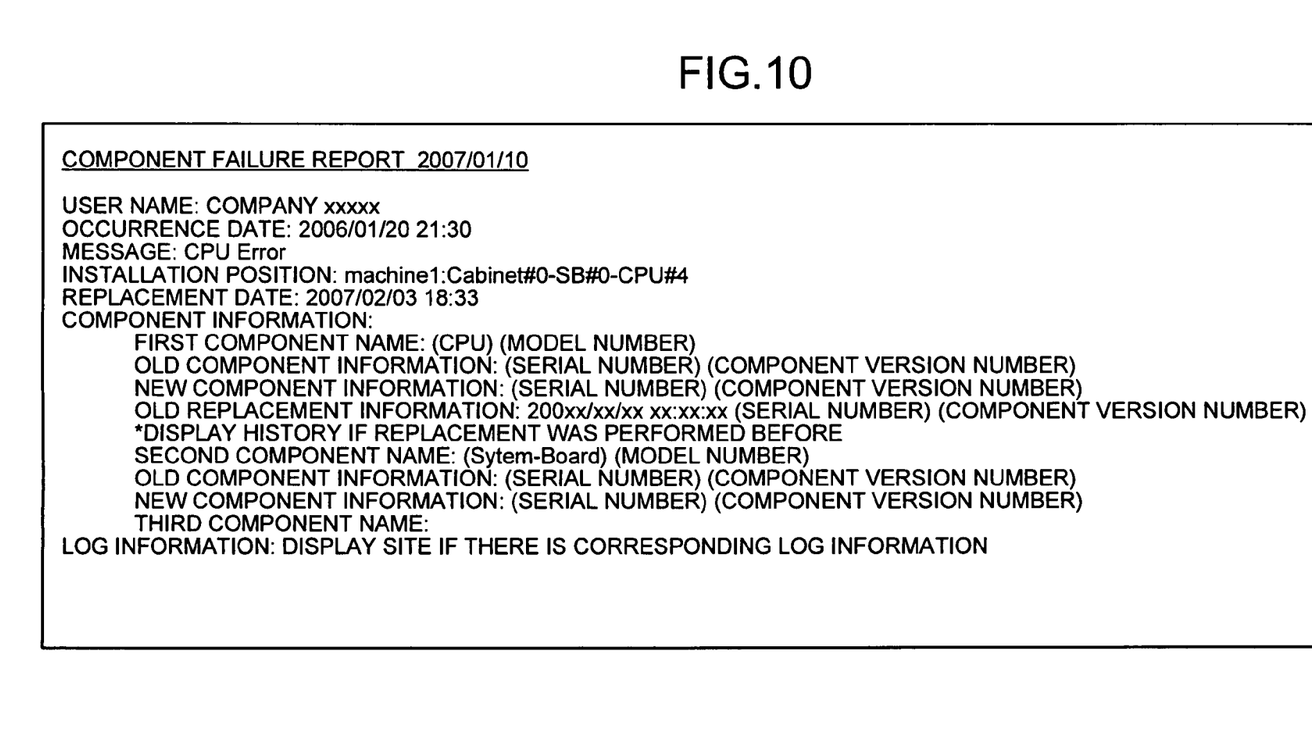
FIG. 10 is a view of an example of the data structure of a component failure report.

FIG. 10 is a view of an example of a data structure of the component failure report. The component failure report generating unit 160d compares the installation position information in the component replacement event information and the installation position information in the component list 150a with each other and then determines the management number corresponding to the identical installation position information. The component failure report generating unit 160d then generates a component failure report by searching for information unique to the pre-replacement component and information unique to the post-replacement component from the component detail information 150b using the determined management number as a key.

If there are a plurality of pieces of information unique to the component that corresponds to the management number (if, for example, component replacement has been performed at least twice), information unique to the component corresponding to the management number may be also registered in the component failure report. The component failure report generating unit 160d may register the message and the replacement date information, which are contained in the component detail information, in the component failure report.

Because the component failure report, which is generated by the component failure report generating unit 160*d*, is, for example, transmitted directly to the terminal device in the factory or the terminal device in the maintenance department (see FIG. 1), information reliability can be maintained (Conversely, if a worker manually creates a report on the information unique to the pre-replacement component and the information unique to the post-replacement component, a human error may occur).

Figure 11:
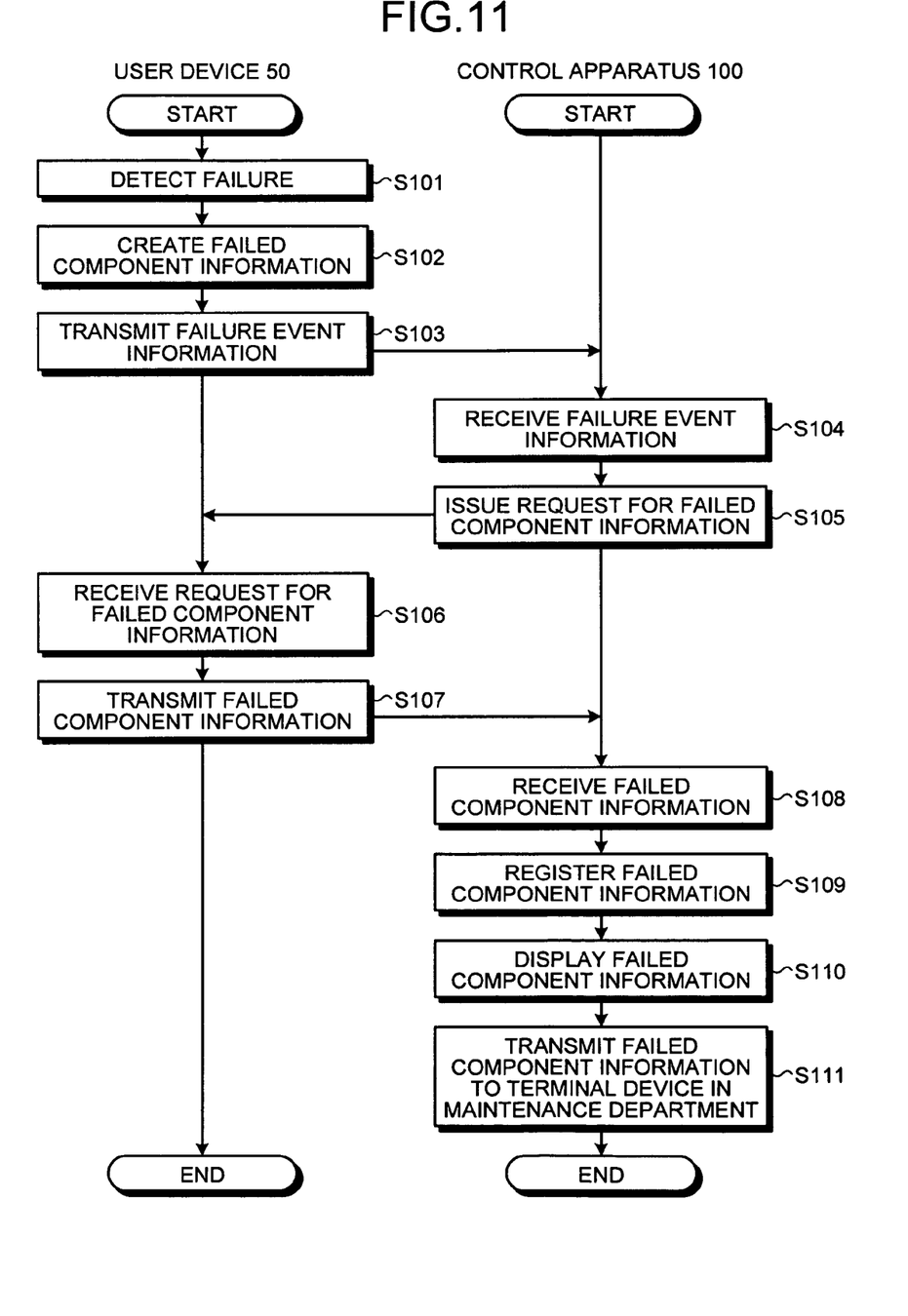
FIG. 11 is a flowchart of a process that is performed by the system when the user device detects a failure.
Figure 12:
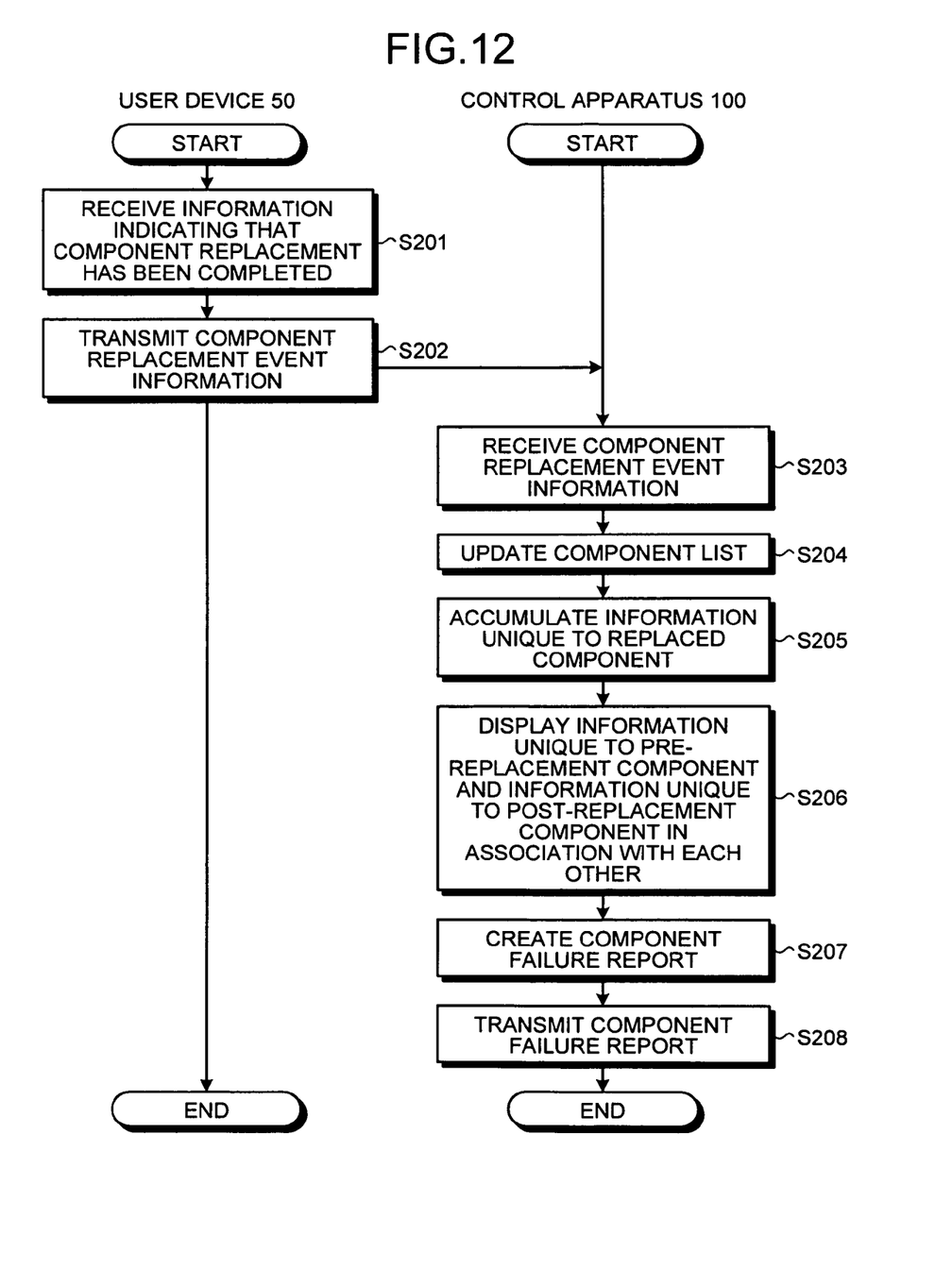
FIG. 12 is a flowchart of a process that is performed by the system when a failed component is replaced.

A process procedure of a system that includes the control apparatus 100 according to the embodiment will be explained below. FIG. 11 is a flowchart of the processes that are performed by the system when the user device 50 detects a failure. FIG. 12 is a flowchart of the processes that are performed by the system when a failed component is replaced.

As illustrated in FIG. 11, the user device 50 detects a component failure (step S101), creates failed component information (step S102), and transmits failure event information to the control apparatus 100 (step S103).

The control apparatus 100 receives the failure event information from the user device 50 (step S104), and issues a request for the failed component information to the user device 50 (step S105). The user device 50 receives the request for the failed component information (step S106) and then transmits the failed component information to the control apparatus 100 (step S107).

The control apparatus 100 receives the failed component information (step S108), registers the failed component information (step S109), displays the failed component information (step S110), and transmits the failed component information to the terminal device in the maintenance department (step S111).

As illustrated in FIG. 12, the user device 50 receives information indicating that component replacement has been completed (step S201) and transmits component replacement event information to the control apparatus 100 (step S202). The control apparatus 100 then receives the component replacement event information (step S203).

The control apparatus 100 then updates the component list 150*a* (step S204), accumulates information unique to the replaced component in the component detail information 150*b* (step S205), and displays information unique to the pre-replacement component and information unique to the post-replacement component in association with each other (step S206).

Subsequently, the control apparatus 100 creates a component failure report (step S207) and transmits the created component failure report to the terminal device in the maintenance department and the terminal device in the factory (step S208).

As described above, when a failure has occurred in a component of the user device 50 and the failed component has been replaced with a new component, the control apparatus 100 according to the embodiment stores the information unique to the pre-replacement component and the information unique to the post-replacement component in association with each other and then displays the stored information or transmits the stored information to other terminal devices. Thus, if the information unique to the pre-replacement component is required again, the information unique to the pre-replacement component can be obtained easily from the control apparatus 100.

Furthermore, because the component failure report generating unit 160*d* directly transmits the component failure report to the terminal device in the factory or the terminal device in the maintenance department (see FIG. 1), the control apparatus 100 according to the embodiment can maintain information reliability (Conversely, if a worker manually creates a report on the information unique to the pre-replacement component and the information unique to the post-replacement component, a human error may occur).

In the control apparatus 100 according to the embodiment, messages are registered in the component detail information 150*b*, so workers can easily know why component replacement has been performed. In addition, because the information unique to the pre-replacement component and the information unique to the post-replacement component are associated with each other, workers can easily confirm whether component replacement has been performed.

Among the above-described processes according to the embodiment, the processes that are explained as those that are manually performed may be automatically performed entirely or partly, and the processes that are explained as those that are automatically performed may be manually performed entirely or partly. The process procedures, the control procedures, the specific names, and information containing various types of data and parameters may be arbitrarily changed unless otherwise stated.

The components of the user device 50 illustrated in FIG. 2 and of the control apparatus 100 illustrated in FIG. 5 are functional concepts and are not required to be physically configured as illustrated in the drawings. In other words, the specific modes of separation or integration of the devices are not limited to those illustrated in the drawings. The devices may be configured in a way that they are entirely or partially separated or integrated functionally or physically on an arbitrary basis in accordance with various loads or how they are used. Furthermore, each process function performed by each device may be entirely or arbitrarily partly implemented by a CPU or programs that are analyzed and executed by the CPU, or may be implemented as wired logic hardware.

Figure 13:
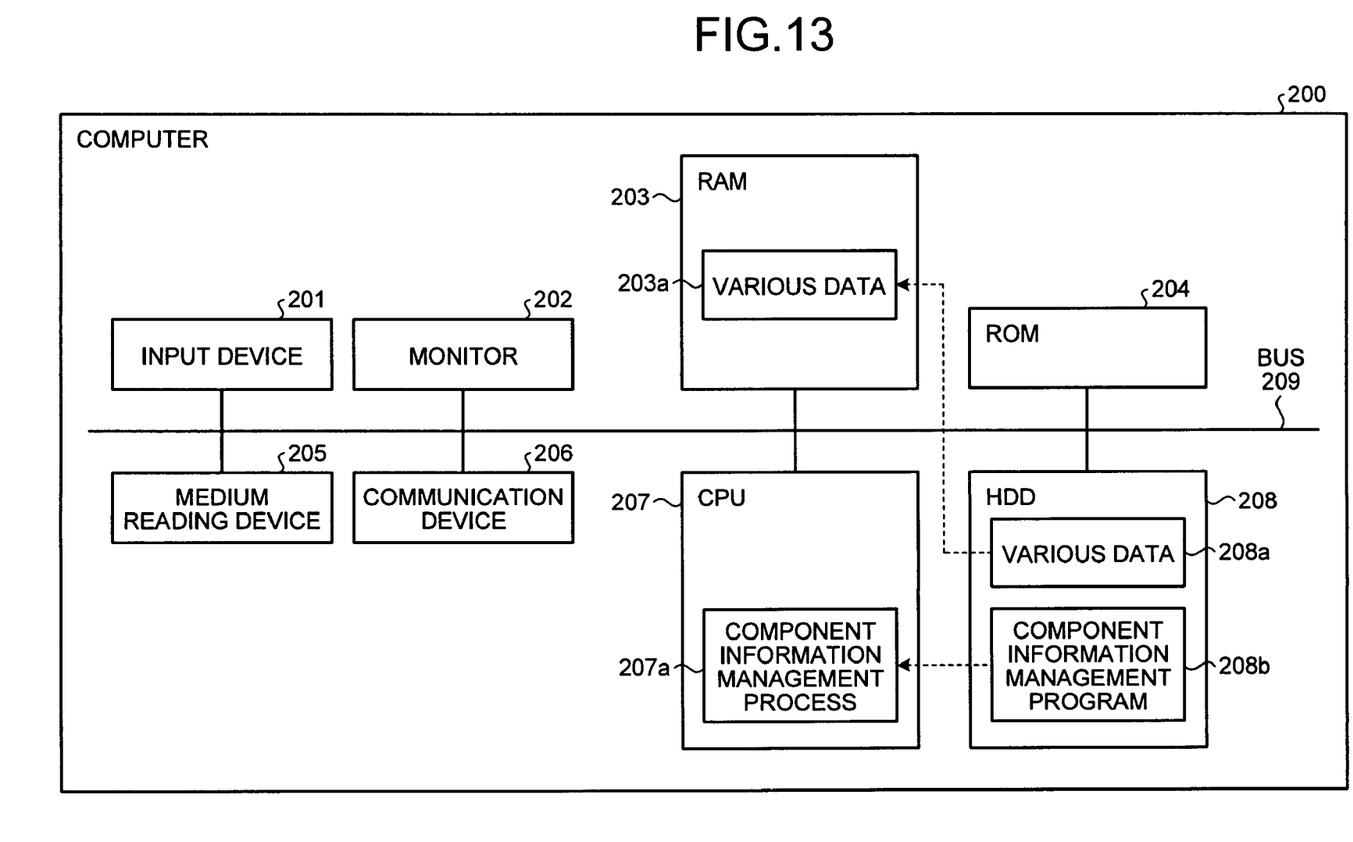
FIG. 13 is a diagram of a hardware configuration of a computer that configures the control apparatus according to the embodiment.

FIG. 13 is a diagram of a hardware configuration of a computer 200 as which the control apparatus 100 according to the embodiment can be configured. As illustrated in FIG. 13, the computer (the control apparatus) 200 is configured by connecting, via a bus 209, an input device 201, a monitor 202, a random access memory (RAM) 203, a read only memory (ROM) 204, a medium reading device 205 that reads data from a storage medium, a communication device 206 that communicates data with other devices (for example, the terminal device in the maintenance department and the terminal device in the factory), a central processing unit (CPU) 207, and a hard disk drive (HDD) 208.

The HDD 208 stores a component information management program 208*b* that implements similar functions as those of the control apparatus 100. The CPU 207 reads the component information management program 208*b* and executes the program, so that a component information management process 207*a* is started. The component information management process 207*a* corresponds to the component information collecting unit 160*a*, the component information updating unit 160*b*, the component installation information generating unit 160*c*, and the component failure report generating unit 160*d*, which are illustrated in FIG. 5.

The HDD 208 stores various data 208*a* that corresponds to the component list 150*a*, the component detail information 150*b*, and the transmission destination list 150*c*. The CPU 207 reads the various data 208*a* that is stored in the HDD 208, stores the data in the RAM 203 in order to accumulate the information unique to the component in various data 203a, which is stored in the RAM 203, and generates component association information.

The component information management program 208b represented in FIG. 13 is not necessarily required to be stored originally in the HDD 208. For example, the component information management program 208b may be stored such that a computer can read the component information management program 208b from a medium or another computer and then execute the program. The medium may be "a portable physical medium" that is inserted into the computer, such as a flexible disk (FD), a CD-ROM, a DVD disk, a magneto-optical disk, and an IC card, or the medium may be "a fixed physical medium" that is provided in or outside the computer, such as a hard disk drive (HDD). The other computer may be "another computer (or a server)" that is connected to the computer via, for example, public lines, the Internet, a LAN, or a WAN.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control apparatus that controls a device to which the control apparatus is connected, the control apparatus comprising:
   a storing unit that stores an error message that contains information on a failed component in a storage device upon receiving the error message from the device; and
   a linking unit that stores the error message and information on a replacement component, which has been installed in the device in place of the failed component, in the storage device in association with each other upon receiving the information on the replacement component.

2. The control apparatus according to claim 1, further comprising a transmitting unit that transmits the error message and the information on the replacement component, which are stored in the storage device and associated, to a pre-set transmission destination.

3. The control apparatus according to claim 1, further comprising an output unit that outputs the error message and the information on the replacement component in association with each other on the basis of information stored in the storage device, when a request for the information on a component that has been installed in the device is made.

4. A computer readable storage medium having stored therein a control program, which causes a computer to execute a process comprising:
   storing an error message that contains information on a failed component in a storage device upon receiving the error message from a control-target device; and
   storing the error message and information on a replacement component, which has been installed in the control-target device in place of the failed component, in the storage device in association with each other upon receiving the information on the replacement component.

5. The computer readable storage medium according to claim 4, wherein the process further comprises
   transmitting the error message and the information on the replacement component, which are stored in the storage device and associated, to a pre-set transmission destination.

6. The computer readable storage medium according to claim 4, wherein the process further comprises
   outputting the error message and the information on the replacement component in association with each other on the basis of information stored in the storage device, when a request for the information on a component that has been installed in the control-target device is made.

* * * * *